Dec. 16, 1952  J. W. GRAY  2,622,231
INTEGRATOR
Filed Sept. 28, 1948
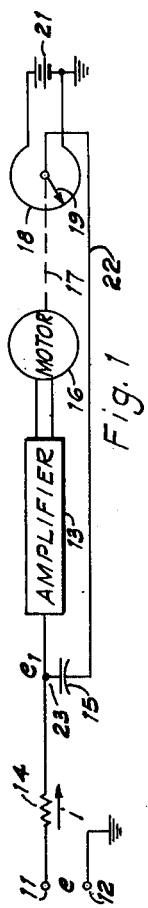
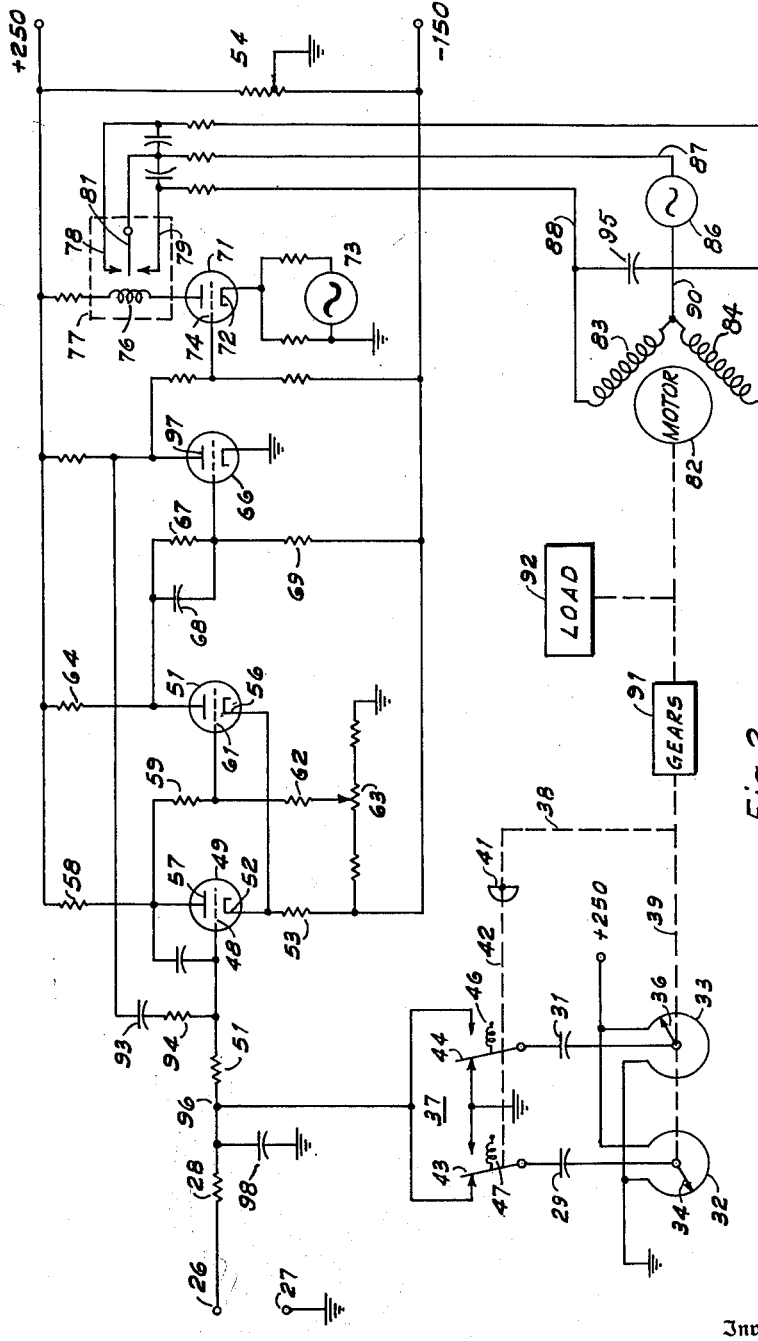
Inventor
JOHN W. GRAY
By
H. S. Mackey
Attorney Patented Dec. 16, 1952

2,622,231

UNITED STATES PATENT OFFICE 2,622,231

INTEGRATOR

John W. Gray, White Plains, N. Y., assignor to General Precision Laboratory Incorporated, a corporation of New York Application September 28, 1948, Serial No. 51,610

14 Claims. (Cl. 318—18)

The present invention relates to an integrator particularly of the type wherein an electrical potential input is converted to a mechanical rotation whose speed at any given time is proportional to the momentary value of the input potential and whose total rotation over an interval of time, therefore, is proportional to the time integral of the input potential.

Specifically the instant invention utilizes a resistance capacity network as the basic time standard or integrating network. This network constitutes the input for an extremely high gain amplifier which is provided with a negative feedback circuit including a motor and potentiometer which changes the potential impressed across the capacity of the resistance capacity network at a rate equal but opposite to the rate of charge acquired by the capacity. By proper choice of circuits and elements the charging rate of the capacity is equal to the quotient of impressed input potential and the value of resistance in the resistance capacity network. The rotational speed of the motor and potentiometer, therefore, is a direct function of the input potential and the values of capacity and resistance of the input network, producing a system where wear is not a vital factor and does not affect the accuracy of the system as long as it continues to function at all.

Additionally high precision and accuracy are achieved with relatively inexpensive components which are not subject to instability as the result of temperature changes.

In addition to the main negative feedback circuit, the instant invention also includes an additional and auxiliary feedback circuit which acts to store any short-time errors of integration which might result from sudden speed changes, slight sticking or hunting of the motor, etc. By storing these errors and reintroducing proper corrective factors into the system when the conditions which produced the errors have past, the auxiliary feedback circuit acts as what might be termed a memory circuit which remembers past variations that have not been translated into rotary motion and produces a correction of such motion at proper times so that over the total interval of time the integral is correct despite any occurrence of transient errors in the system.

By thus preventing the accumulation of small errors, there is provided an integrator which may integrate variations of input over indefinite periods of time with extremely high accuracy.

As will be easily appreciated, a device of this nature may be used in an almost endless number of applications, such as electric computing machines, computer for navigational systems, combat trainers and the like. It is extremely advantageous, therefore, to provide as does the instant invention, a device which is relatively simple and at the same time achieves high precision with inexpensive components.

The exact nature of the invention will be more readily understood from the following detailed description when considered together with the attached drawings, in which:

Figure 1 is a simplified schematic diagram illustrating the principles involved in performing the integrating function.

Figure 2 is a schematic diagram illustrating more in detail one form which may be accorded to the present invention.

Referring now to Fig. 1 the voltage variations which are to be integrated are impressed on terminals 11 and 12 connected to the input of an extremely high gain amplifier 13 through a network consisting of the resistor 14 and the condenser 15. A motor 16 is connected in the output circuit of the amplifier 13 and is operated in one direction or the other at a speed of rotation which is dependent upon the output derived from the amplifier. The shaft 17 of the motor is connected to operate the rotatable contact 19 of a potentiometer 18 connected to a source of potential 21 so that the potential of the moving contact at any instant of time is proportional to its position at that instant and its rate of change of potential varies as its speed of traverse over the potentiometer and hence the speed of the motor 16. This movable contact 19 is connected through a conductor 22 to the condenser 15 thereby forming the main negative feedback loop of the system.

In explaining the operation of the system of Fig. 1 and the manner in which an integration of the input potential is obtained, certain assumptions will be made for the present, leaving to further description the exact apparatus used and the manner in which it functions to support these assumptions.

It is assumed for example, that the amplifier 13 has such an extremely high gain over its range of operation that the voltage at its input, namely, the voltage $e_1$ at terminal 23 is held substantially at zero relative to ground by the feedback action of the connection consisting of the motor 16, potentiometer 18, contact 19 and conductor 22 despite a wide variation in input to the system and output of the amplifier.

Under such an assumption the current $i$ flowing through the resistor 14 at any instant of time will have a value equal to $$i = \frac{e}{R} \quad (1)$$

where $e$ is the value of the potential impressed on the input at that instant and R is the resistance of resistor 14.

It is likewise assumed that the amplifier 13 has a grid input which takes no appreciable current so that the current $i$ flows only into condenser 15. The potential across the condenser, therefore, changes at a rate equal to $$\frac{i}{C} \text{ or } \frac{e}{RC}$$

where C is the capacity of the condenser 15 and $e$, R and $i$ have the values as given above.

Under the assumptions made above, however, the potential at the input of the amplifier 13 must be maintained constant and therefore the feedback potential $e_0$ obtained from the movable contact on the potentiometer must change at an equal rate but in the opposite direction, that is $$\frac{de_0}{dt} = \frac{-e}{RC} \quad (2)$$

Inasmuch as the rate of change of $e_0$, i. e., $$\frac{de_0}{dt}$$

is produced by the rate of movement of the potentiometer contact any time that $$\frac{de_0}{dt}$$

is not equal to $$\frac{-e}{RC}$$

the potential $e_1$ of the terminal 23 will start to change. If for example, the tendency for $e_1$ to change is in the positive direction an increased output is obtained from the amplifier which causes the motor and hence potentiometer to increase in speed of rotation thus increasing the rate of change of the potential fed back to the condenser to restore the balance and maintaining the input potential $e_1$ at zero. Conversely a tendency for the potential $e_1$ to change in negative direction results in a reduced amplifier output and a reduction in speed of rotation of the motor 16 and potentiometer contact 19 again restoring balance.

The change in potential obtained from the varying position of the contact 19 of the potentiometer depends on the speed of rotation thereof or change in angular position with respect to the ratio of total potential impressed across the potentiometer and the total potentiometer angle, that is:

$$\frac{de_0}{dt} = \frac{d\theta}{dt} \frac{V}{\theta_t} \quad (3)$$

where $\theta$ is the angle assumed by the movable contact, $\theta_t$ is the total potentiometer angle and V is the potential impressed across the potentiometer.

Substituting the values given in Equation 2 and transposing there is obtained the equation $$\frac{d\theta}{dt} = \frac{\theta_t}{V} \frac{e}{RC} \quad (4)$$

If V is kept constant as it is in the present invention the total rotation $\theta$ is given by the expression $$\theta = \frac{\theta_t}{VRC} \int e \, dt \quad (5)$$

hence the total rotation over any selected interval of time is directly proportional to the integral of the potential applied to the system over that interval of time, and the direction of rotation is in one direction such that the feedback potential $e_0$ is decreasing when the applied potential $e$ is positive and is in the opposite direction such that the feedback potential $e_0$ is increasing when $e$ is negative. If the input potential becomes zero the output rotation stops wherever it may be.

To put the matter in another way the input potential $e$ whose time integral is to be determined produces a current flow $i$ through the resistor 14 which is directly proportional thereto since the resistance R of the resistor 14 is constant and the potential $e_1$ at the input of the amplifier and hence the end of the resistor opposite to the input terminal is kept at zero. The current $i$ must flow into the condenser 15 tending to produce a potential thereacross whose rate of increase is directly proportional to the current flowing therein since the capacity of the condenser C is kept constant, and the potential which is tended to be produced across the condenser 15 is also directly proportional to the input potential $e$ since the current $i$ is directly proportional thereto.

However, since the input potential $e_1$ of the amplifier must be maintained at zero for all practical purposes there must be a negative feedback of a potential which at all times is equal and opposite to the potential change that is tended to be created by the current $i$ flowing into the condenser 15 and hence the rate of change of this feedback potential must at all times be equivalent and opposite to the instantaneous current $i$ and hence the instantaneous input potential $e$. The rate of change of this feedback potential, however, is governed by the speed at which the potentiometer contact 19 traverses the potentiometer 18 and hence is proportional to the speed of rotation of the shaft 17 so that at any instant of time the shaft 17 is rotating at a speed and in a sense directly proportional to the value of the input potential $e$ and the amount of rotation over an interval of time will constitute a summation or the integral of the various instantaneous speeds and hence the integral of the input potential.

For performing the integrating functions a device such as illustrated in some detail in Fig. 2 may be employed to advantage.

The potential which is to be integrated is applied to the input terminals 26 and 27 of the system and the main resistance capacity integrating network is comprised of resistor 28 and condensers 29 and 31. It will be obvious that if integration is to proceed indefinitely there must be a continuous rotation of the potentiometer. A single potentiometer, however, must have some gap between its terminals and it is preferable that the sudden voltage changes which are caused by the contact in its journey across the gap from one end of the potentiometer should not be impressed on the system.

To this end in the preferred arrangement of Fig. 2, two potentiometers 32 and 33 having movable contacts 34 and 36 so positioned that they are displaced on their respective potentiometers approximately 180° from each other. Each of the respective contacts 34 and 36 is connected to a respective one of the condensers 29 and 31 and a two pole double throw switch 37 is so arranged that only the condenser and movable contact which is not approaching its respective gap is connected in the circuit.

As illustrated in the circuit of Fig. 2, the shaft 38 connected to the shaft 39 which drives the movable contacts 34 and 36 is provided with a cam 41. The cam 41 in turn abuts against a rod or shaft 42 to which the switch blades or armatures 43 and 44 are connected. The armatures 43 and 44 are biased in one direction by the springs 46 and 47 so that unless urged in a direction to make contact with the left hand switch contacts by the shaft 42 and cam 41, the springs cause engagement with the right hand switch contacts. For approximately half a revolution of the movable contacts 34 and 36 the left hand switch contacts are engaged through the action of the cam 41 and rod 42 while during the remaining half revolution the armatures 43 and 44 are urged against the right hand contacts by the springs 46 and 47.

Assuming that the armatures are in the position of engagement shown, the potentiometer 32 and condenser 29 are connected in the feedback loop circuit while the upper plate of condenser 31 is grounded. Sometime before the movable contact 34 reaches the open space of the potentiometer 32, the cam 41 has revolved to such an extent that the armatures 43 and 44 are allowed to be moved to their right hand position under the action of springs 46 and 47. This position causes the potentiometer 33 and condenser 31 to be connected in the feedback loop and the upper plate of condenser 29 to be connected to ground. Since just prior to this switching action the condenser which is next to be connected in the circuit has its terminal remote from that connected to the movable contact of its respective potentiometer grounded, the potential impressed across the condenser is equal to the potential impressed thereon at the time of switching so that adverse transient effects are in large measure avoided.

The condenser 98 assists in smoothing out the mechanical motion at the instant of switching preventing transient effects which would be likely to cause a brief but sudden increase in the speed of the motor during the instant that the switch 37 is open.

It will be readily appreciated that equivalent devices may be utilized in place of the exact switching arrangement shown. For example, a commutator may be used or the switches may be actuated by relays which are energized at appropriate intervals rather than by the purely mechanical arrangement of a cam and springs as shown. Likewise, it is not necessary that two entirely separate potentiometers be used although such an arrangement is shown for clarity. The same purposes may be served by a single potentiometer having two separate movable contacts displaced at an angle to each other. Nor is the time of switching critical, it being essential only that the switch be operated so that neither of the movable contacts is connected in the feedback circuit when at the open space of the potentiometer or potentiometers.

The input integrating network consisting of resistor 28 and one or the other of condensers 29 or 31 depending on the actuation of the switch 37, is connected to the grid 48 of a tube 49 through a resistance 51 which forms part of the auxiliary feedback or memory circuit whose operation will be described hereinafter.

As stated above, it is one of the criterions of the instant invention that the deviation from zero of the potential at the grid of tube 49 shall be negligible as compared with the available range of input potentials at the terminals 26 and 27. This criterion may be attained by the manner in which the tube 49 is interconnected with the following stage 51.

The cathode 52 of the tube 49 is connected to the negative terminal of the supply source, indicated diagrammatically by the divider resistor 54 through a relatively high resistance 53. The cathode 56 of tube 51 is directly connected to the cathode 52 so that the anode currents of both tubes flow through this resistor. The anode 57 of tube 49 is connected to the positive terminal of the supply source 54 through a resistor 58 and also through a resistor 59 to the grid 61 of the tube 51 so that the potential applied to this grid is a function of the potential of the anode 57, the static bias being provided by the resistor 62 and divider 63.

Suppose that the potential on the grid 48 tends to rise above the zero point, then this reduction of bias of the grid 48 with respect to its cathode 52 will result in an increased anode current flow through the tube 49. Such an increased current flow, however, results in a decreased potential being applied to the anode 57 as a result of the increased drop in the anode resistor 58. This reduction in anode potential likewise results in a reduction of the potential applied to the grid 61 so that the bias of this grid as respects its cathode 56 is increased resulting in a reduced anode current flow in this tube. The anode current of tube 51, however, flows through the resistor 53 connected in the cathode circuit of tube 49 so that a reduction in the current reduces the potential drop produced across this resistor and hence reduces the potential of the cathode 52. Because it is the relative potential of cathode and grid which controls the output of the tube, the reduction of cathode potential amounts to the same thing as an increase in potential of the grid and it is not necessary for the grid potential to increase to increase the output of the tube.

At first glance, it may seem paradoxical that an increase in input applied to the terminals 26 and 27 may result in an increase in output without a concomitant increase of potential at the grid 48 but circuit parameters may be so chosen for the interconnected network above described that not only may the potential of the cathode 52 be so varied in an opposite direction as to cause the grid potential to remain stationary over a reasonable operating range but even over compensation may be obtained if such were desired whereby the grid potential is actually decreased as the input is increased. This situation obtains, of course, only up to the saturation of the tubes 49 and 51 and as a practical matter it is not necessary that the grid potential be held to an absolute zero but only that its change in potential is insignificant as compared with other factors which might introduce errors of integration, such as tube drift and the like. Likewise, the stages 49 and 51 need not be comprised of separate tubes as shown but may consist of two triode sections in a single envelope.

The output of tube 51 obtained from the potential drop produced across the anode resistor 64 is impressed on the input of tube 66 through the network consisting of resistors 67 and 69 and condenser 68. The output of tube 66 is in turn resistance coupled to the input of the final stage 71 which has its cathode 72 connected to have a small alternating current potential impressed thereon from the alternating current source 73 so that the bias on this tube fluctuates between limits which are determined by the signal potential applied to the grid 74.

There will be then a fluctuating current in the anode circuit of this tube the average value of which is determined by the signal potential applied to the input of the tube. This fluctuating potential is caused to flow through the actuating coil 76 of a relay 77 which additionally includes a pair of substantially fixed contacts 78 and 79 and a spring armature 81 actuated by the current flowing in the coil 76.

The circuit parameters are such and the armature 81 is so biased that when there is a certain signal input to the tube 71, the fluctuations of anode current thereof are such as to cause the armature 81 to engage the contacts 78 and 79 for equal lengths of time as the anode current fluctuates from its maximum to its minimum as a result of the alternating potential impressed on the cathode 72. When, however, the signal potential is increased and the average anode current is also increased the armature 81 will be caused to engage the contact 78, for example, for a larger period of time during a cyclic variation than it engages contact 79, and conversely a reduction in signal potential decreases the average anode current and the armature 81 engages the contact 79 for a longer period of time than it engages the contact 78, the relative periods of time being dependent on the value of the signal potential.

This action controls the direction and speed of rotation of the motor 82 in the following manner: The motor 82 is a two phase motor having field coils 83 and 84 wound 90° out of phase as respects each other. If these field coils are supplied with alternating current energy and the current in one coil is made to lead the other by 90° the motor will rotate in one direction whereas if the current in the second coil is made to lead that in the first by 90° the motor will rotate in the opposite direction.

When the armature 81 engages contact 79, alternating current is supplied from the source 86 to the field coil 83 through a circuit which includes the conductor 87, armature 81, contact 79, conductor 88, field coil 83 and conductor 90 back to the source 86. On the other hand, the circuit which supplies energy to the field coil 84 includes the conductor 87, armature 81, contact 79, conductor 88, condenser 95, field coil 84 and conductor 90. Because the condenser 95 is included in the circuit which energizes the field coil 84 the current through this coil leads that supplied to coil 83 by 90° and the torque applied to the motor is such as to cause it to tend to rotate in say a counterclockwise direction. When, however, the armature 81 is caused to engage the contact 78 it will be apparent that the circuit connections are reversed, the condenser 95 now being included in the circuit which energizes field coil 83 and field coil 84 being connected directly to the source. This current flowing through the field coil 83, therefore, now leads that flowing through field coil 84 and the torque applied to the motor is such as to cause it to tend to rotate in a clockwise direction.

If the armature 81 is vibrated rapidly, say at sixty cycles per second, and this armature engages contacts 78 and 79 for exactly equal intervals of time, the motor 82 will tend to rotate first in one direction and then the other under equal and opposite torque impulses. Because the motor has some inertia and the equal and opposite torque impulse are rapidly applied no rotation will occur. However, if the armature 81 engages one of the contacts 78 or 79 for a longer interval than it does the other, there will be a resultant torque developed by the motor 82 which tends to rotate it in one direction or the other at a speed which is determined by the relative time engagement of the contacts 78 and 79 and hence the relative unbalance of opposing torques developed in the motor.

It will be apparent, therefore, that the varying signal input to the tube 71 will produce a rotation of the motor 82 in one direction or the other at a speed which is dependent upon that input.

The motor 82 is connected through suitable gears 91 to the shaft 39 which operates the moving contactors 34 and 36 of the potentiometers 32 and 33 thus completing the main negative feedback circuit and a utilization circuit or load 92 may be connected to the motor either directly to the motor shaft or through the medium of suitable gears as the occasion demands. The load 92 may be any suitable device such as a counter or recorder depending on the use to which the present invention is put.

To prevent errors of integration due to short time variations in the operation of the system such as potentiometer ripple, sudden speed changes of the motor, etc., an auxiliary negative feedback circuit is provided which in effect acts as a memory circuit storing the correct variations in input and reintroducing them into the system at the proper time so that the total rotation is the correct integral of the input despite the occurrence of any short time errors of operation.

This auxiliary negative feedback or memory circuit consists of a series circuit composed of the condenser 93 resistance 94 and resistance 51 connected between the anode of the tube 66 and the terminal 96 of the input integrating network.

As a criterion for correct operation and integration it is required that the potential of the terminal 96 be maintained at zero or ground potential by the negative feedback operation of the integrating mechanism comprising the motor 82 and potentiometers 32 and 33. If this loop operates so that at all instants of time the potential of the terminal 96 is at such ground potential the total rotation of the motor and the potentiometer contacts will be the exact integral of the input potential over the interval of time considered.

Suppose, however, that through some fortuitous circumstance as by an inaccurate speed change of the motor, an erroneous integrating action might result. Assume further, for the purposes of explanation, that this erroneous action is such as to cause the potential of terminal 96 to rise above ground. This increase in potential of the terminal 96 would also tend to increase the potential of the grid 48 of the input stage 49 but because of the negative feedback connection comprising the condenser 93 and resistance 94 connected between the anode 97 of the tube 66 and the grid 48 there is produced instead an opposite change in the potential of the anode 97, maintaining the grid 48 at zero potential and producing a potential drop across the resistor 51 and hence a current therethrough which is proportional to the error deviation. This current flows into the condenser 93 producing a potential thereacross proportional to the integrated flow of such current and hence the integral of the error deviation. In order that the grid 48 be held at zero potential, therefore, the potential of the anode 97 must decrease at a rate proportional to the error deviation.

When, however, conditions become such that normal operation may be resumed, the potential of the anode 97 cannot return to its original value until all the charge accumulated on the condenser 93 by the flow of current through the resistor 51 has returned through the resistor 51. Such a return flow of current will cause the potential of the terminal 96 to be reduced below the zero point by an amount and for a time which corresponds to the amount and time of previous accidental increase so that the potential of the terminal 96 averages zero and hence the integral of the current flowing through the resistance 28 must all eventually appear as a change on condenser 29 or 31 whichever is in use at the time and hence the total integral will be correct in spite of short time errors.

For example, in a device of this nature which has been constructed the potentiometer shaft may be held against rotation momentarily by hand and when released the speed of rotation is increased for a short interval correcting for the error introduced by the temporary restraint of the operating mechanism. Thus temporary errors of integration are remembered and correction applied so that the total integral is accurate.

What is claimed is:

1. In a device for integrating a variable input electrical quantity, capacitive means, conductive means through which said capacitive means may be charged in one direction or the other depending upon the sense of the input quantity, a source of electrical energy for supplying a charge to said capacitive means independent of said input quantity, means responsive to the magnitude and sense of said input quantity for controlling the rate of charging of said capacitive means from said independent source in magnitude and sense equal and opposite, respectively, to the instantaneous rate of charging of said capacitive means produced by the input quantity, the net amount of energy from said source supplied to said capacitive means constituting the integral of the varying input quantity over a given period of time.

2. In a device for integrating a variable input electrical quantity, capacitive means, conductive means for charging said capacitive means at a rate equal to said input quantity and in one sense or the opposite sense depending on whether the input quantity is of one sense or the opposite sense, a source of electrical energy for supplying a charge to said capacitive means independent of said input quantity, means for controlling the charging of said capacitive means from said independent source at a rate substantially equal and opposite to the instantaneous rate of charging by said input quantity, said control means comprising a velocity servo loop including an amplifier, the output of which is a direct function of the input quantity, and a motor controlled by said amplifier, said servo having such a speed characteristic that said motor is rotated at such speeds and in such a direction that the rate of charging of said capacitive means from said independent source is substantially equal and opposite to the instantaneous rate of charging produced by the input quantity and the amount of rotation of said motor over a period of time constitutes the integral of the varying input quantity over that period of time.

3. A device according to claim 2 in which said amplifier includes an auxiliary negative feedback circuit having a second capacitive means therein which is charged at a rate and in a sense dependent on accidental and fortuitous unbalance of the charging rates occasioned by the conductive means and the rotatable means and means for transferring said charge to said first capacitive means when conditions which produced such unbalance have ceased whereby the total integral is correct despite the occurrence of short time errors of operation.

4. In a device for integrating a variable input potential, a resistor connected to have said variable input potential impressed thereon whereby a current is produced therein which is proportional to said input potential, capacitive means connected to said resistor whereby said capacitive means is charged by the current flowing in said resistor, an amplifier having its input connected to said resistor and said capacitive means, motor means connected to the output of said amplifier operative at a speed and in a direction dependent on the level of the energy output thereof, potentiometer means having a source of potential impressed thereacross, movable contact means for said potentiometer means rotatable by said motor means, an electrical circuit connecting said movable contact means and said capacitive means whereby the rate of change of potential produced by said charging current is opposed by an equal rate of change of potential as a result of the rotation of said movable contact means and a utilization circuit connected to said motor means.

5. A device according to claim 4 in which said capacitive means includes at least two condensers and said movable contact means includes two contacts electrically displaced with respect to each other, each of said contacts being connected to a respective one of said condensers and switch means whereby said condensers and their associated movable contacts are alternately connected in circuit with the input of said amplifier.

6. A device according to claim 5 in which said switching means additionally includes contact means whereby the condenser not connected to said amplifier input is grounded at its terminal opposed to the terminal connected to said potentiometer contact.

7. In a device for integrating a variable input potential, a resistor connected to have said variable potential impressed thereon whereby a current is produced therein which is proportional to said input potential, capacitive means connected to said resistor whereby said capacitive means is charged by the current flowing in said resistor, an amplifier having its input connected to said resistor and said capacitive means, motor means connected to the output of said amplifier operative at a speed and in a direction dependent on the level of the energy output thereof, potentiometer means having a source of potential impressed thereacross, movable contact means for said potentiometer means rotatable by said motor means, an electrical circuit connecting said movable contact means and said capacitive means producing a rate of change of potential which is in opposition to the rate of change of potential produced by said charging current, means included in said amplifier for storing fortuitous differences in the rate of change of potential produced by said charging current and the rate of change of potential produced as a result of the rotation of said movable contact means and for reintroducing said differences into the system in such a sense as to correct for transient errors.

8. A device according to claim 7 in which said means for storing fortuitous differences in rates of change of potential and for correcting for transient errors includes a second resistor connected between the common junction of said capacitive means and said first-mentioned resistor and the input of said amplifier and a negative feedback circuit for said amplifier said negative feedback circuit including a series connected condenser.

9. In a device for integrating a variable input potential and converting said integral to a mechanical movement, an amplifier including a first amplifier section having at least an anode, cathode and control electrode, a second amplifier section having at least an anode, cathode and control electrode, a resistor connected in the cathode circuits of said first and second sections, a direct current circuit connecting the anode of said first section to the control electrode of said second section, an output stage, a coupling circuit connecting the output of said second section and the input of said output stage, motor means operative at a speed and in a direction dependent on the level of energy output of said output stage, a resistor having one terminal connected to the source of potential to be integrated, a circuit connecting the other terminal of said resistor to the control electrode of said first amplifier section, capacitive means connected to a terminal of said circuit intermediate said resistor and said control electrode whereby the current flowing through said resistor as a result of said variable input potential charges said capacitive means at a rate dependent thereon, means operative by said motor means for varying the potential impressed on said capacitive means at a rate substantially equal and opposite to the rate of potential change occasioned by the charging of said capacitive means by the current flowing through said resistor and a load connected to said motor means.

10. A device according to claim 9 in which the means for varying the potential impressed on said capacitive means at a rate substantially equal and opposite to the rate of potential change occasioned by the charging of said condenser comprises potentiometer means connected across a potential source and having movable contact means electrically connected to said capacitive means and mechanically actuated by said motor means.

11. A device according to claim 9 in which said amplifier includes negative feedback circuit means for storing fortuitous differences in rates of change of potential produced by said charging current and by said means operative by said motor means and for reintroducing said differences into the system in such a sense as to correct for transient errors.

12. In a device for integrating a variable input potential and converting said integral to a mechanical movement, an amplifier including a first amplifier section having at least an anode, cathode and control electrode, a second amplifier section having at least an anode, cathode and control electrode, a resistor connected in the cathode circuits of said first and second sections, a direct current circuit connecting the anode of said first section to the control electrode of said second section, an output stage, a coupling circuit connecting the output of said second section and the input of said output stage, a motor coupled to said output stage operative at a speed and in a direction dependent on the output energy level, a resistor having one terminal connected to the source of potential to be integrated, a circuit connecting the other terminal of said resistor to the control electrode of said first amplifier section, first and second condensers, switching means for alternately connecting respective terminals of said first and second condensers to a terminal of said last-mentioned circuit intermediate said resistor and said control electrode, potentiometer means including a pair of movable contacts electrically displaced with respect to each other said movable contacts being electrically connected to the remaining terminals of said first and second condensers and being mechanically rotated by said motor and a load connected to said motor.

13. A device according to claim 12 in which said amplifier includes negative feedback circuit means for storing fortuitous rates of change in potential occurring at the terminal of the circuit to which said condensers are alternately connected and for reintroducing said rates of change into the system in such a sense as to correct for transient errors.

14. A device according to claim 12 in which the coupling circuit connecting the output of said second section and the input of the output stage includes a thermionic tube having at least a cathode, anode and control electrode, a circuit including a condenser connected between said last-mentioned anode and the control electrode of said first amplifier section and a resistor connected between the terminal to which said first and second condensers are alternately connected and the control electrode of said first amplifier section.

JOHN W. GRAY.

REFERENCES CITED

The following references are of record in the file of this patent:

UNITED STATES PATENTS

| Number | Name | Date |
|---|---|---|
| 2,448,564 | Wilkerson | Sept. 7, 1948 |
| 2,460,638 | Gilbert | Feb. 1, 1949 |
| 2,513,537 | Williams | July 4, 1950 |

OTHER REFERENCES

"Analysis of Problems in Dynamics by Electronic Circuits," Ragazzini et al., I. E. Proceedings, vol. 35, No. 5, May 1947, pps. 444–452.

"An All Electric Integrator for Solving Differential Equations," Varney, Review of Scientific Instruments, January 1942, pps. 10–16.

"Elements of D-C," Korn, Electronics, April 1948, pps. 122–127.

"Design of D-C Electronic Integrator," Korn, Electronics, May 1948, pps. 124–126.

"Compact Analog Computer," Frost, Electronics, July 1948, pps. 116–120, 122.

"A Voltage Integrator," Bussell et al., Review of Scientific Instruments, volume 19, No. 10, October 1948.